US011205967B2

(12) United States Patent
Wang et al.

(10) Patent No.: US 11,205,967 B2
(45) Date of Patent: Dec. 21, 2021

(54) VOLTAGE CONVERSION APPARATUS WITH FEEDBACK CIRCUIT INCLUDING RESISTOR NETWORK AND VOLTAGE CONVERSION METHOD THEREOF

(71) Applicant: Power Forest Technology Corporation, Hsinchu County (TW)

(72) Inventors: Wen-Sheng Wang, Taoyuan (TW); Chia-Hsien Liu, Chiayi County (TW)

(73) Assignee: Power Forest Technology Corporation, Hsinchu County (TW)

( * ) Notice: Subject to any disclaimer, the term of this patent is extended or adjusted under 35 U.S.C. 154(b) by 63 days.

(21) Appl. No.: 16/790,767

(22) Filed: Feb. 14, 2020

(65) Prior Publication Data

US 2021/0226541 A1 Jul. 22, 2021

(30) Foreign Application Priority Data

Jan. 17, 2020 (TW) .................................. 109101750

(51) Int. Cl.
*H02M 3/335* (2006.01)
*H02M 1/00* (2006.01)

(52) U.S. Cl.
CPC ...... *H02M 3/33523* (2013.01); *H02M 1/0025* (2021.05)

(58) Field of Classification Search
CPC .............................................. H02M 3/335–42
See application file for complete search history.

(56) References Cited

U.S. PATENT DOCUMENTS

| 4,481,564 | A | * | 11/1984 | Balaban | ............ | H02M 3/33546 |
| | | | | | | 363/19 |
| 2018/0159434 | A1 | * | 6/2018 | Werner | ............. | H02M 3/33561 |

FOREIGN PATENT DOCUMENTS

| TW | 461169 | 10/2001 |
| TW | 200824250 | 6/2008 |
| TW | 201406034 | 2/2014 |
| WO | 2008089541 | 7/2008 |

* cited by examiner

*Primary Examiner* — Peter M Novak
(74) *Attorney, Agent, or Firm* — JCIPRNET

(57) ABSTRACT

A voltage conversion apparatus and a voltage conversion method thereof are provided. A conversion circuit converts outputs of a plurality of secondary windings to generate a conversion voltage or a conversion current to a resistor network of a feedback circuit to thereby change impedance characteristics of the resistor network. The feedback circuit adjusts a feedback voltage in response to the change in the impedance characteristics of the resistor network, so that a control circuit controls an output of a transformer circuit according to the feedback voltage.

7 Claims, 2 Drawing Sheets

VOLTAGE CONVERSION APPARATUS WITH FEEDBACK CIRCUIT INCLUDING RESISTOR NETWORK AND VOLTAGE CONVERSION METHOD THEREOF

CROSS-REFERENCE TO RELATED APPLICATION

This application claims the priority benefit of Taiwan application serial no. 109101750, filed on Jan. 17, 2020. The entirety of the above-mentioned patent application is hereby incorporated by reference herein and made a part of this specification.

BACKGROUND OF THE INVENTION

1. Field of the Invention

The invention relates to an electronic apparatus, and more particularly, to a flyback apparatus and a voltage conversion method thereof.

A power conversion apparatus converts an unstable high input voltage provided by a power company into various DC output voltages applicable to electronic devices. Therefore, power conversion apparatuses are widely used in electronic devices such as light source modules of display devices (such as a liquid crystal screen, an LED, a TV, an electronic display board, a lighting device, etc.), automotive electronics, computers, office automation equipment, industrial control equipment, and communication equipment.

Generally, in order to provide an operating voltage required for operation of different circuits in an electronic device, an AC voltage is first converted into a low-voltage DC voltage through a rectifier, and then the DC voltage is converted by a DC-DC voltage converter to boost it to the required voltage. Although the required operating voltage can be obtained in this way, the disposition of DC-DC voltage converter increases circuit complexity, and there is also power loss during voltage conversion performed by the DC-DC voltage converter, resulting in reduced energy efficiency of an electronic device.

SUMMARY OF THE INVENTION

The invention provides a voltage conversion apparatus and a voltage conversion method thereof, to convert an AC voltage into a plurality of DC voltages with different voltage values without a need to additionally dispose a DC-DC voltage conversion apparatus, thereby reducing power loss.

The voltage conversion apparatus of the invention includes a transformer circuit, a feedback circuit, a first conversion circuit, a switch, and a control circuit. The transformer circuit includes a primary winding and a plurality of secondary windings. The feedback circuit is coupled to the transformer circuit and is configured to generate a feedback voltage according to an output of each of the secondary windings. The feedback circuit includes a resistor network. The first conversion circuit is coupled to the transformer circuit and the feedback circuit and is configured to convert the output of the plurality of secondary windings to generate a corresponding conversion voltage or a corresponding conversion current to the resistor network to thereby change an impedance characteristic of the resistor network. The feedback circuit adjusts the feedback voltage in response to a change in the impedance characteristic of the resistor network. The control circuit is coupled to the switch and the feedback circuit and is configured to control a conduction state of the switch according to the feedback voltage to control an output of the transformer circuit.

In an embodiment of the invention, the resistor network includes a plurality of first resistor elements. A first terminal of each of the first resistor elements is coupled to a corresponding secondary winding, and a second terminal of each of the first resistor elements is coupled to an output terminal of the first conversion circuit. The second resistor element is coupled between the output terminal of the first conversion circuit and a ground. The feedback circuit adjusts the feedback voltage according to a voltage at a common contact between the plurality of first resistor elements and the second resistor element.

In an embodiment of the invention, the first conversion circuit includes a plurality of converters coupled to the corresponding plurality of secondary windings. Each of the converters converts an output voltage or an output current of a secondary winding corresponding to the converter into the corresponding conversion voltage or the corresponding conversion current to the resistor network.

In an embodiment of the invention, the plurality of converters include at least one of a voltage converter, a voltage-current converter, a current converter, and a current-voltage converter.

In an embodiment of the invention, the feedback circuit further includes an optocoupler coupled to a first terminal of one of the plurality of first resistor elements. A first terminal and a second terminal of the voltage regulator are coupled to the optocoupler and a ground, respectively, and a control terminal of the voltage regulator is coupled to the common contact between the plurality of first resistor elements and the second resistor element. The voltage regulator generates a regulated current according to a voltage at the common contact between the plurality of first resistor elements and the second resistor element. The optocoupler generates the feedback voltage according to the regulated current.

In an embodiment of the invention, the voltage conversion apparatus further includes a second conversion circuit coupled to the transformer circuit and the second terminal of the voltage regulator and configured to convert the outputs of the plurality of secondary windings to generate an adjustment current to adjust the regulated current.

In an embodiment of the invention, the second conversion circuit converts an output voltage or an output current of each of the secondary windings to generate the adjustment current.

The invention further provides a voltage conversion method of a voltage conversion apparatus. The voltage conversion apparatus includes a transformer circuit. The transformer circuit includes a primary winding and a plurality of secondary windings. The voltage conversion method includes the following: converting outputs of the plurality of secondary windings to generate a corresponding conversion voltage or a corresponding conversion current to a resistor network in a feedback circuit to thereby change an impedance characteristic of the resistor network; adjusting a feedback voltage according to a change in the impedance characteristic of the resistor network; and controlling an output of the transformer circuit according to the feedback voltage.

In an embodiment of the invention, the resistor network includes a plurality of first resistor elements and a second resistor element. A first terminal of each of the first resistor elements is coupled to an output terminal of a corresponding secondary winding, and the second resistor element is coupled between second terminals of the plurality of first resistor elements and a ground. The adjusting the feedback voltage according to the change in the impedance characteristic of the resistor network includes: adjusting the feedback voltage according to a voltage at a common contact between the plurality of first resistor elements and the second resistor element.

In an embodiment of the invention, the feedback circuit includes an optocoupler and the voltage conversion method includes: generating a regulated current according to a voltage at a common contact between the plurality of first resistor elements and the second resistor element to the optocoupler, so that the optocoupler generates the feedback voltage according to the regulated current.

In an embodiment of the invention, the voltage conversion method further includes: converting the outputs of the plurality of secondary windings to generate an adjustment current to the optocoupler, so that the optocoupler generates the feedback voltage according to the regulated current and the adjustment current.

Based on the above, the first conversion circuit in the embodiments of the invention may convert the outputs of the plurality of secondary windings to generate the corresponding conversion voltage or the corresponding conversion current to the resistor network in the feedback circuit, thereby changing the impedance characteristic of the resistor network. The feedback circuit may adjust the feedback voltage in response to the change in the impedance characteristic of the resistor network, so that the control circuit controls the conduction state of the switch according to the feedback voltage, thereby controlling the output of the transformer circuit. In this way, the impedance characteristic of the resistor network is changed through the conversion voltage or the conversion current generated by the first conversion circuit, and a feedback weight of the output of each of the secondary windings may be dynamically adjusted, so that the control circuit controls the output of the transformer circuit in real time in response to the change in the impedance characteristic of the resistor network, thereby ensuring that a voltage required for a load corresponding to each of the secondary windings can be obtained. Because the voltage conversion apparatus has a plurality of secondary windings, an AC input voltage may be directly converted into a plurality of DC voltages with different voltage values without a need to additionally dispose a DC-DC voltage conversion apparatus, so that circuit complexity can be effectively reduced, thereby improving conversion efficiency of the voltage conversion apparatus.

To make the features and advantages of the invention clear and easy to understand, the following gives a detailed description of embodiments with reference to accompanying drawings.

DESCRIPTION OF THE EMBODIMENTS

Figure 1:
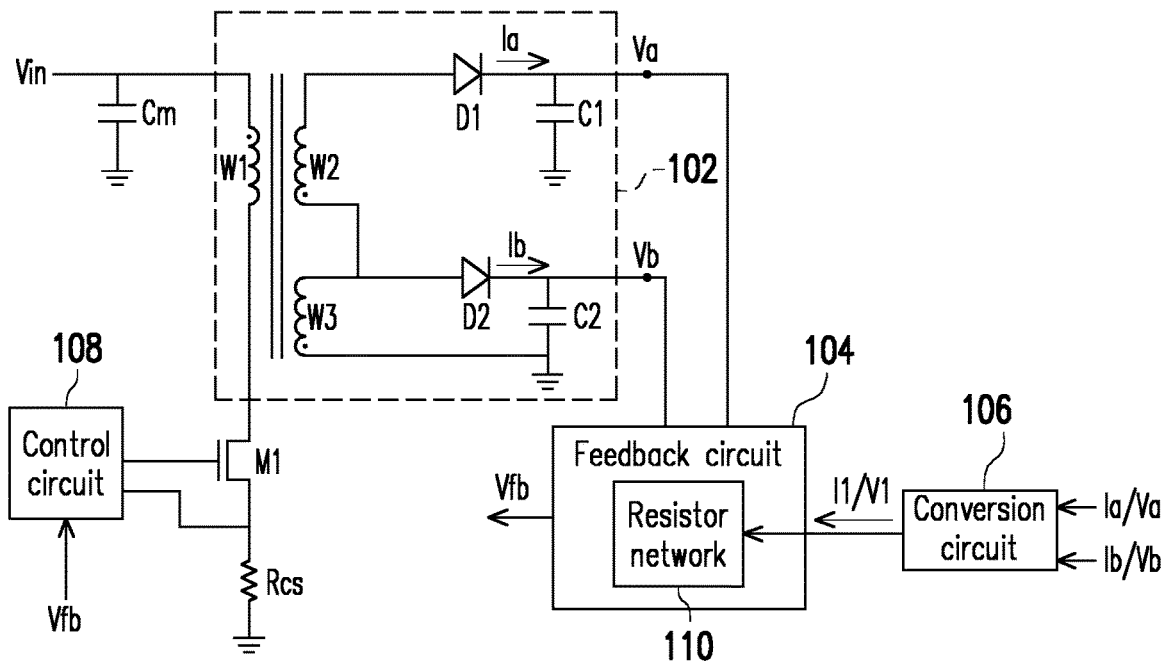
FIG. 1 is a schematic diagram of a voltage conversion apparatus according to an embodiment of the invention.

Referring to FIG. 1, FIG. 1 is a schematic diagram of a voltage conversion apparatus according to an embodiment of the invention. The voltage conversion apparatus may be, for example, a flyback converter, and includes a transformer circuit 102, a feedback circuit 104, a conversion circuit 106, a switch M1, and a control circuit 108. An input terminal of the transformer circuit 102 is configured to receive a rectified AC voltage to obtain a DC input voltage Vin. An output terminal of the transformer circuit 102 is coupled to the feedback circuit 104. The conversion circuit 106 is coupled to the transformer circuit 102 and the feedback circuit 104. The feedback circuit 104 is coupled to the control circuit 108. The switch M1 is coupled to the transformer circuit 102 and the control circuit 108, and is coupled to the ground through a resistor Rcs.

Further, the transformer circuit 102 may include, for example, a primary winding W1, a secondary winding W2, a secondary winding W3, a diode D1, a diode D2, a capacitor C1, and a capacitor C2. The input terminal of the transformer circuit 102 is coupled to one terminal of the capacitor Cm, and one terminal of the capacitor Cm is connected to the ground. The diode D1 is coupled between the secondary winding W2 and the feedback circuit 104. The diode D2 is coupled between the secondary winding W3 and the feedback circuit 104. The capacitor C1 is coupled between the diode D1 and the ground. The capacitor C2 is coupled between the diode D2 and the ground. The transformer circuit 102 may be configured to convert the input voltage Vin into output voltages Va and Vb. For example, the output voltage Va may be, for example, a voltage used to drive a backlight module, and its voltage value may be, for example, 12 volts. The output voltage Vb may be, for example, a voltage required for operation of a system circuit of a display, and its voltage value may be, for example, 5 volts. However, the invention is not limited thereto. In other embodiments, the voltage values and uses of the output voltages Va and Vb may vary.

The feedback circuit 104 includes a resistor network 110. The resistor network 110 may divide an output voltage of the transformer circuit 102, so that the feedback circuit 104 generates a feedback voltage Vfb according to the divided voltage of the resistor network 110. In addition, the conversion circuit 106 may convert outputs of the secondary winding W2 and the secondary winding W3, to generate a corresponding conversion voltage V1 or a corresponding conversion current I1 to the resistor network 110, thereby changing an impedance characteristic of the resistor network 110. In this way, the feedback circuit 104 not only generates, based on the outputs of the secondary winding W2 and the secondary winding W3, the feedback voltage Vfb to the control circuit 108, but also adjusts the feedback voltage Vfb in response to the change in the impedance characteristic of the resistor network 110. In addition, the resistor Rcs may sense a current of the primary winding W1 to generate a sensing voltage to the control circuit 108.

The control circuit 108 may control a conduction state of the switch M1 (which is implemented by a transistor in the present embodiment) according to the sensing voltage and the feedback voltage Vfb, and then control the output of the transformer circuit 102. The conversion circuit 106 may, for example, convert the output voltages Va and Vb of the secondary winding W2 and the secondary winding W3 into the conversion voltage V1 or the conversion current I1, to convert the outputs of the secondary winding W2 and the secondary winding W3, but the invention is not limited thereto. Alternatively, output currents Ia and Ib of the secondary winding W2 and the secondary winding W3 may be converted to obtain the conversion voltage V1 or the conversion current I1. Alternatively, output currents of some secondary windings (for example, the secondary winding W2) and output voltages of remaining secondary windings (for example, the third winding W3) may be converted to obtain the conversion voltage V1 or the conversion current I1.

In this way, the impedance characteristic of the resistor network 110 is changed through the conversion voltage V1 or the conversion current I1 generated by the conversion circuit 106, and feedback weights of the outputs of the secondary windings W2 and W3 may be dynamically adjusted, so that the control circuit 108 controls the output of the transformer circuit 102 in real time in response to the change in the impedance characteristic of the resistor network 110. For example, when the output voltage of any of the secondary windings W2 and W3 decreases due to a load change, the control circuit 108 can immediately control, in response to the change in the impedance characteristic of the resistor network 110, the transformer circuit 102 to increase the output voltage thereof, thereby ensuring that voltages required for loads corresponding to the secondary windings W2 and W3 can be obtained. Because the voltage conversion apparatus has a plurality of secondary windings, an input voltage Vin may be directly converted into a plurality of DC voltages Va and Vb with different voltage values without a need to additionally dispose a DC-DC voltage conversion apparatus, so that circuit complexity can be effectively reduced, thereby improving conversion efficiency of the voltage conversion apparatus.

Figure 2:
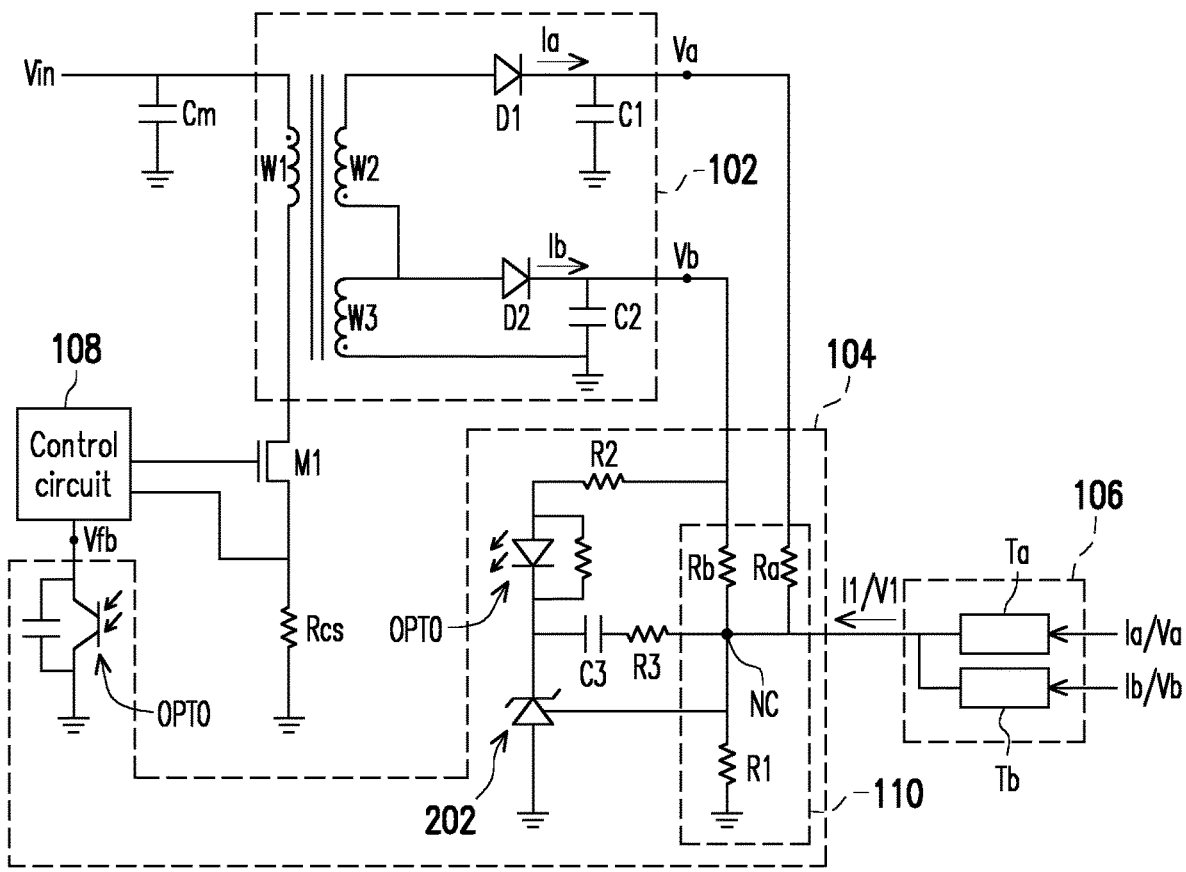
FIG. 2 is a schematic diagram of a voltage conversion apparatus according to another embodiment of the invention.

FIG. 2 is a schematic diagram of a voltage conversion apparatus according to another embodiment of the invention. Referring to FIG. 2, in the present embodiment, a conversion circuit 106 may include a converter Ta and a converter Tb. The converter Ta is configured to convert an output voltage or an output current of the secondary winding W2 into a current. The converter Tb is configured to convert an output voltage or an output current of the secondary winding W3 into a current. In other words, the converter Ta and the converter Tb may be voltage converters or voltage-current converters according to application requirements. A current converted and output by the converter Ta and the converter Tb may form the conversion voltage V1 or the conversion current I1 to be transmitted to the resistor network 110.

In the present embodiment, the resistor network 110 may include resistor elements Ra, Rb, and R1. In addition to the resistor network 110, a feedback circuit may further include resistor elements R2 and R3, a capacitor C3, an optocoupler OPTO, and a voltage regulator 202. The resistor elements Ra, Rb, and R1-R3 may be implemented by, for example, a resistor, an MOS transistor, or a BJT transistor, but the invention is not limited thereto. In addition, the voltage regulator 202 may be, for example, a TL431 parallel regulator, but the invention is not limited thereto. First terminals of the resistor elements Ra and Rb are coupled to outputs of the secondary windings W2 and W3, respectively. The resistor element R1 is coupled between second terminals of the resistor elements Ra and Rb and the ground. The optocoupler OPTO is coupled to the first terminal of the resistor element Rb through the resistor element R2 and is coupled to a first terminal of the voltage regulator 202 and to the control circuit 108. A second terminal of the voltage regulator 202 is coupled to the ground. A control terminal of the voltage regulator 202 is coupled to a common contact NC. The capacitor C3 and the resistor element R3 are connected in series between a common contact between the optocoupler OPTO and the voltage regulator 202 and a common contact NC among the resistor elements Ra, Rb, and R1.

The resistor elements Ra, Rb, and R1 may divide the output voltages Va and Vb to generate a divided voltage at the common contact NC. The voltage regulator 202 may generate a regulated current in direct proportion to a difference between the divided voltage and an internal reference voltage. The regulated current is converted into the feedback voltage Vfb by the optocoupler OPTO. In addition, the converter Ta and the converter Tb may convert the outputs of the secondary windings W2 and W3, respectively, to output the conversion voltage V1 or the conversion current I1 to the resistor network 110, to change an impedance characteristic at the common contact NC and dynamically adjust feedback weights of the outputs of the secondary windings W2 and W3. The change in the impedance characteristic at the common contact NC affects the regulated current output by the voltage regulator 202 and the feedback voltage Vfb converted and output by the optocoupler OPTO, and the control circuit 108 may adjust the output of the transformer circuit 102 according to the feedback voltage Vfb. In other words, the control circuit 108 may control the output of the transformer circuit 102 in response to the change in the impedance characteristic of the resistor network 110 in real time, thereby ensuring that voltages required for loads corresponding to the secondary windings W2 and W3 can be obtained.

Figures 3, 4:
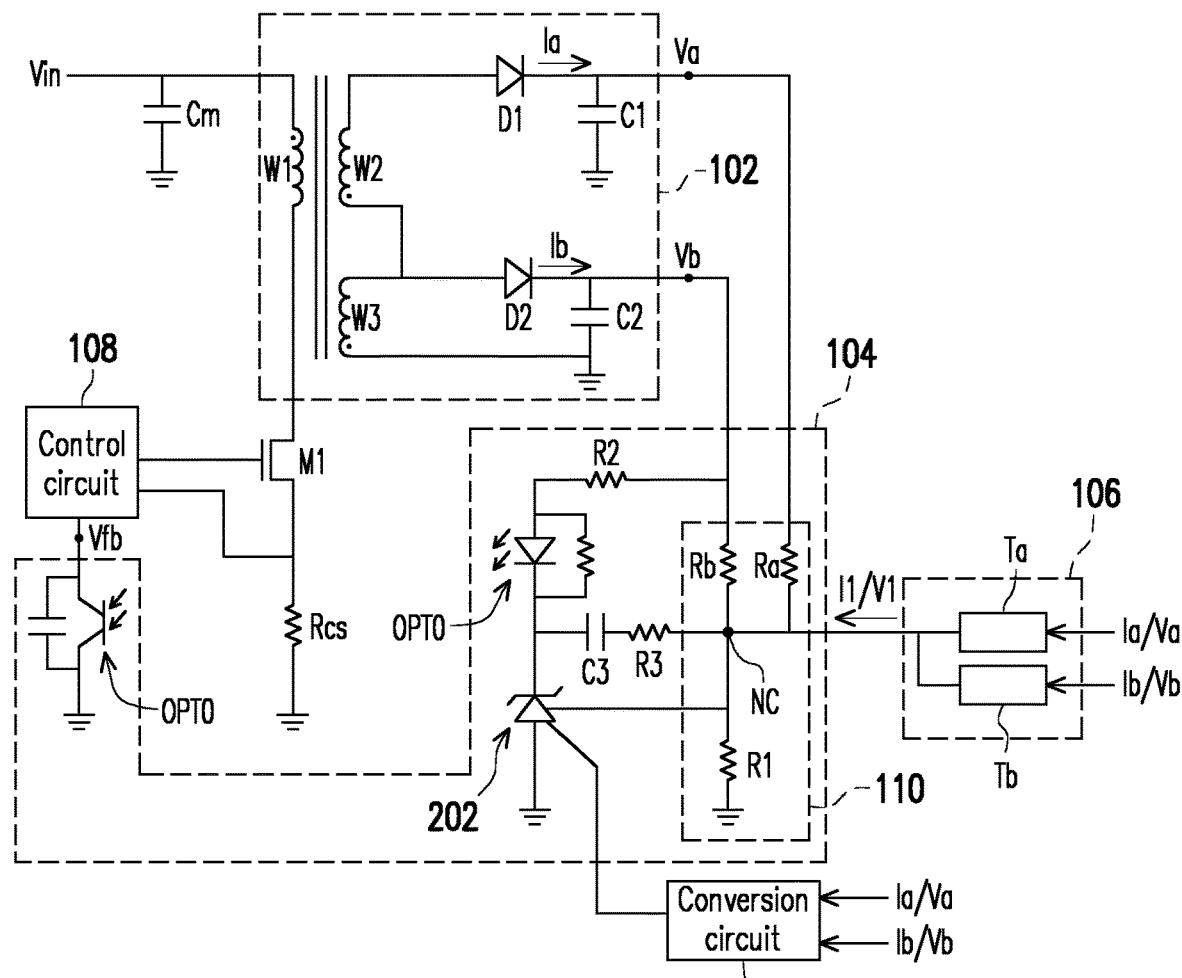
FIG. 3 is a schematic diagram of a voltage conversion apparatus according to another embodiment of the invention.
FIG. 4 is a schematic flowchart of a voltage conversion method of a voltage conversion apparatus according to an embodiment of the invention.

FIG. 3 is a schematic diagram of a voltage conversion apparatus according to another embodiment of the invention. Referring to FIG. 3, different from the voltage conversion apparatus in the embodiment in FIG. 2, the voltage conversion apparatus in the present embodiment further includes a conversion circuit 302. The conversion circuit 302 may be coupled to the transformer circuit 102 and the second terminal of the voltage regulator 202. The conversion circuit 302 may convert outputs (such as an output voltage, an output current, or a combination of an output voltage and an output current) of the secondary windings W2 and W3 to generate an adjustment current, so as to adjust the regulated current provided by the voltage regulator 202 to the optocoupler OPTO. Compared with the embodiment in FIG. 2, the conversion circuit 302 in the present embodiment of the invention causes the feedback circuit 104 to more quickly adjust the output voltage of the transformer circuit 102 in response to the change in the outputs of the secondary windings W2 and W3, so that voltages required for loads corresponding to the secondary windings W2 and W3 can be obtained. An implementation of the conversion circuit 302 is similar to an implementation of the conversion circuit 106 in the embodiment in FIG. 2, and therefore the descriptions thereof are omitted herein.

It is worth noting that although the two secondary windings W2 and W3 are used as an example in the above embodiments to describe the voltage conversion apparatus, the number of secondary windings is not limited to the above embodiment. In other embodiments, the transformer circuit 102 may include more secondary windings.

FIG. 4 is a schematic flowchart of a voltage conversion method of a voltage conversion apparatus according to an embodiment of the invention. It may be learned from the above embodiments that the voltage conversion method of the voltage conversion apparatus may include the following steps. First, outputs of a plurality of secondary windings are converted to generate a corresponding conversion voltage or a corresponding conversion current to a resistor network in a feedback circuit to thereby change an impedance characteristic of the resistor network (step S402). The resistor network may include a plurality of first resistor elements corresponding to the plurality of secondary windings. The plurality of first resistor elements and a second resistor element are connected in series between the plurality of secondary windings and the ground. A divided voltage generated through division of an output voltage of the secondary winding may be generated at a common contact between the plurality of resistor elements and the second resistor element. Then, a feedback voltage is adjusted according to the change in the impedance characteristic of the resistor network (step S404). For example, the feedback voltage may be adjusted according to a voltage at a common contact between the plurality of first resistor elements and the second resistor element. For example, a regulated current may be generated according to the voltage at the common contact between plurality of the first resistor elements and the second resistor element to an optocoupler, so that the optocoupler generates the feedback voltage according to the regulated current. In some embodiments, the outputs of the plurality of secondary windings may be converted to generate an adjustment current to the optocoupler, so that the optocoupler generates the feedback voltage according to the regulated current and the adjustment current. Finally, an output of the transformer circuit is controlled according to the feedback voltage (step S406).

In summary, the first conversion circuit in the embodiments of the invention may convert the outputs of the plurality of secondary windings to generate the corresponding conversion voltage or the corresponding conversion current to the resistor network in the feedback circuit, thereby changing the impedance characteristic of the resistor network. The feedback circuit may adjust the feedback voltage in response to the change in the impedance characteristic of the resistor network, so that the control circuit controls the conduction state of the switch according to the feedback voltage, thereby controlling the output of the transformer circuit. In this way, the impedance characteristic of the resistor network is changed through the conversion voltage or the conversion current generated by the conversion circuit, and a feedback weight of the output of each of the secondary windings may be dynamically adjusted, so that the control circuit controls the output of the transformer circuit in real time in response to the change in the impedance characteristic of the resistor network, thereby ensuring that a voltage required for a load corresponding to each of the secondary windings can be obtained. Because the voltage conversion apparatus has a plurality of secondary windings, an AC input voltage may be directly converted into a plurality of DC voltages with different voltage values without a need to additionally dispose a DC-DC voltage conversion apparatus, so that circuit complexity can be effectively reduced, thereby improving conversion efficiency of the voltage conversion apparatus. In some embodiments, the outputs of the plurality of secondary windings may be converted to generate an adjustment current to the optocoupler, so that the feedback circuit can more quickly adjust the output voltage of the transformer circuit in response to the change in the output of the secondary winding.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims and their equivalents.

What is claimed is:

1. A voltage conversion apparatus, comprising:
   a transformer circuit comprising a primary winding and a plurality of secondary windings;
   a feedback circuit coupled to the transformer circuit and configured to generate a feedback voltage according to an output of each of the secondary windings, wherein the feedback circuit comprises a resistor network;
   a first conversion circuit coupled to the transformer circuit and the feedback circuit and configured to convert the outputs of the secondary windings to generate a corresponding conversion voltage or a corresponding conversion current to the resistor network to thereby change an impedance characteristic of the resistor network, wherein the feedback circuit adjusts the feedback voltage in response to a change in the impedance characteristic of the resistor network;
   a switch; and
   a control circuit coupled to the switch and the feedback circuit and configured to control a conduction state of the switch according to the feedback voltage to control an output of the transformer circuit,
   wherein the resistor network comprises:
   a plurality of first resistor elements, a first terminal of each of the first resistor elements being coupled to a corresponding secondary winding, and a second terminal of each of the first resistor elements being coupled to an output terminal of the first conversion circuit; and
   a second resistor element coupled between the output terminal of the first conversion circuit and a ground, the feedback circuit adjusting the feedback voltage according to a voltage at a common contact between the first resistor elements and the second resistor element,
   wherein the feedback circuit further comprises:
   an optocoupler coupled to a first terminal of one of the first resistor elements; and
   a voltage regulator, a first terminal and a second terminal of the voltage regulator being coupled to the optocoupler and a ground, respectively, and a control terminal of the voltage regulator being coupled to the common contact between the first resistor elements and the second resistor element, the voltage regulator generating a regulated current according to a voltage at the common contact between the first resistor elements and the second resistor element, and the optocoupler generating the feedback voltage according to the regulated current.

2. The voltage conversion apparatus according to claim 1, wherein the first conversion circuit comprises:
   a plurality of converters coupled to the corresponding secondary windings, each of the converters converting an output voltage or an output current of a secondary winding corresponding to the converter into the corresponding conversion voltage or the corresponding conversion current to the resistor network.

3. The voltage conversion apparatus according to claim 2, wherein the converters comprise at least one of a voltage converter, a voltage-current converter, a current converter, and a current-voltage converter.

4. The voltage conversion apparatus according to claim 1, further comprising:
   a second conversion circuit coupled to the transformer circuit and the second ten al of the voltage regulator and configured to convert the outputs of the secondary windings to generate an adjustment current to adjust the regulated current.

5. The voltage conversion apparatus according to claim 4, wherein the second conversion circuit converts an output voltage or an output current of each of the secondary windings to generate the adjustment current.

6. A voltage conversion method of a voltage conversion apparatus, wherein the voltage conversion apparatus comprises a transformer circuit, the transformer circuit comprising a primary winding and a plurality of secondary windings, and the voltage conversion method comprises:
converting outputs of the secondary windings to generate a corresponding conversion voltage or a corresponding conversion current to a resistor network in a feedback circuit to thereby change an impedance characteristic of the resistor network;
adjusting a feedback voltage according to a change in the impedance characteristic of the resistor network; and
controlling an output of the transformer circuit according to the feedback voltage,
wherein the resistor network comprises a plurality of first resistor elements and a second resistor element, a first terminal of each of the first resistor elements being coupled to an output terminal of a corresponding secondary winding, and the second resistor element being coupled between second terminals of the first resistor elements and a ground, and the adjusting the feedback voltage according to the change in the impedance characteristic of the resistor network comprises:
adjusting the feedback voltage according to a voltage at a common contact between the first resistor elements and the second resistor element,
wherein the feedback circuit comprises an optocoupler, and the voltage conversion method comprises:
generating a regulated current according to a voltage at a common contact between the first resistor elements and the second resistor element to the optocoupler, so that the optocoupler generates the feedback voltage according to the regulated current.

7. The voltage conversion method according to claim 6, further comprising:
converting the outputs of the secondary windings to generate an adjustment current to the optocoupler, so that the optocoupler generates the feedback voltage according to the regulated current and the adjustment current.

\* \* \* \* \*